United States Patent [19]

Kuraishi et al.

[11] 3,727,100
[45] Apr. 10, 1973

[54] ELECTRONIC FLASH APPARATUS HAVING CONTROL MEANS FOR PRE-ENABLING LIGHT RESPONSIVE CIRCUIT MEANS

[75] Inventors: Kaoru Kuraishi, Tokyo; Nobuo Yajima, Yokohama; Shigemi Igarashi, Tokyo, all of Japan

[73] Assignee: Toshiba Photo Products Co., Ltd., Tokyo, Japan

[22] Filed: Sept. 29, 1971

[21] Appl. No.: 184,759

[30] Foreign Application Priority Data

June 28, 1971 Japan..............................46/46970

[52] U.S. Cl..............315/151, 95/11.5 R, 250/205, 315/156, 315/241 P
[51] Int. Cl.......G01j 1/46, H05b 41/32, H05b 41/40
[58] Field of Search....................315/149, 151, 156, 315/159, 241 R, 241 P; 250/205; 95/11.5 R

[56] References Cited

UNITED STATES PATENTS 3,350,603 10/1967 Erickson ........................315/151
3,585,442 6/1971 Krusche ........................315/151
3,612,947 10/1971 Dennewitz......................315/151

*Primary Examiner*—Roy Lake
*Assistant Examiner*—Siegfried H. Grimm
*Attorney*—Flynn & Frishauff

[57] ABSTRACT

An electronic flash apparatus including a flash tube for producing light illuminating an object to be photographed by discharge of stored voltage charge in a storage capacitor; and a light responsive integrating circuit adapted to receive light reflected from the object for generating a discharge terminating signal when a quantity of received light reaches a predetermined value, and a switching element or a quench tube for terminating the discharge across the flash tube in response to the discharge terminating signal. A delay circuit is provided for causing the light responsive integrating circuit to be ready to receive the light reflected from the object prior to the production of light by the flash tube in order to measure the light with accuracy from the instant of the production of light.

14 Claims, 2 Drawing Figures

F I G. 1
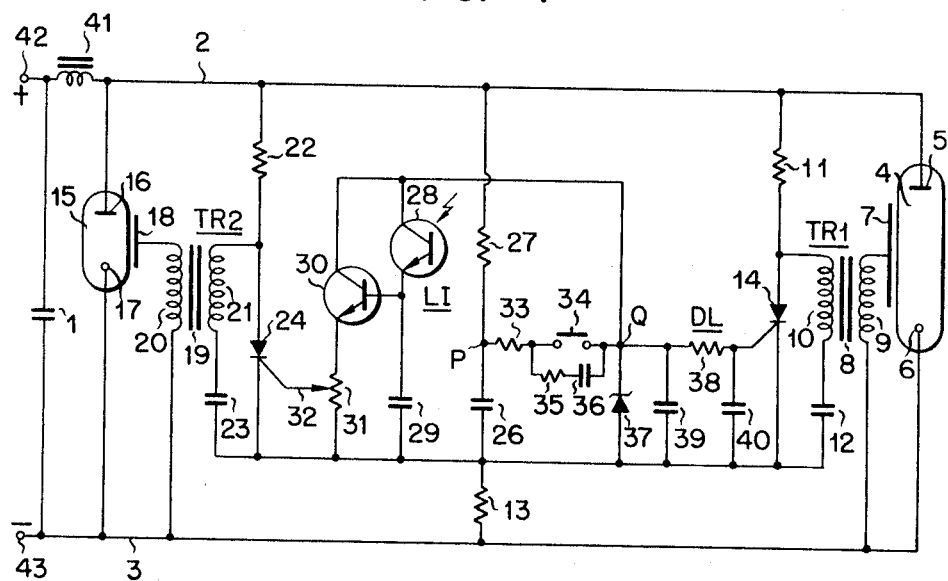
F I G. 2
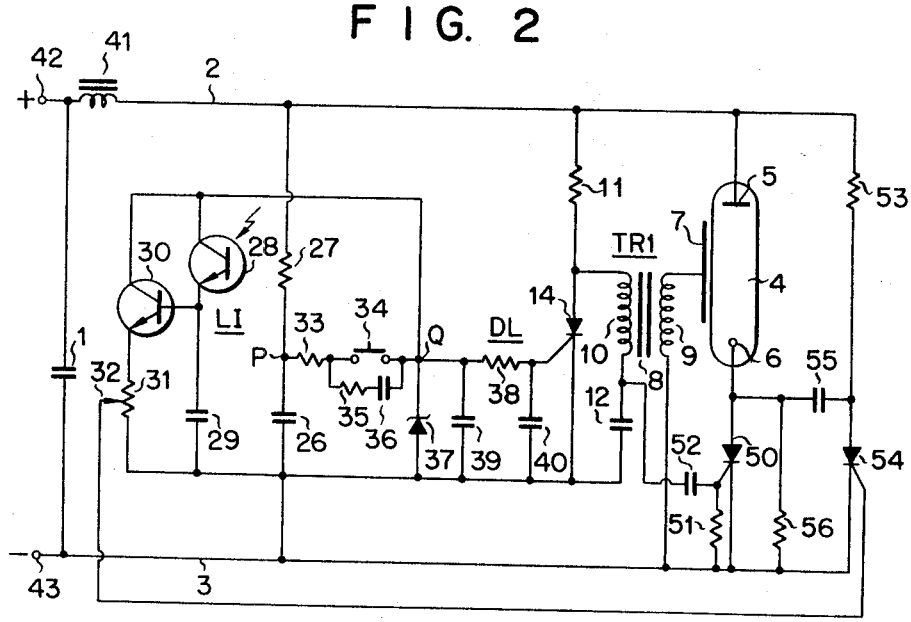

ELECTRONIC FLASH APPARATUS HAVING CONTROL MEANS FOR PRE-ENABLING LIGHT RESPONSIVE CIRCUIT MEANS

BACKGROUND OF THE INVENTION

This invention relates to an electronic photoflash apparatus and, more particularly, to an electronic photoflash apparatus including a light responsive integrating circuit for measuring the quantity of light reflected from an object to be photographed which is made ready to receive the light reflected from the object prior to the production of light by the discharge of a flash tube.

In the field of photoflash apparatus for photography and other uses there has been developed apparatus of the type capable of controlling the discharge duration of a flash tube in order to maintain automatically a quantity of light falling on the film of an associated camera constant irrespective of the distance between the camera and an object to be photographed.

In such apparatus, to the flash tube is connected in parallel a quench tube whose impedance is sufficiently low in its conductive state as compared with that of the flash tube for producing light to illuminate the object to be photographed. A light responsive integrating circuit is provided to receive from the object and produce a discharge terminating signal when the quantity of the received light reached a predetermined value. A trigger circuit responsive to the discharge terminating signal controls a switching circuit means such as the quench tube to terminate the discharge of the flash tube.

Among the previously known devices, apparatus of a type wherein the light responsive integrating circuit above-mentioned is normally made ready to receive the light reflected from the object is disclosed in U.S. Pat. No. 3,033,988. In such apparatus, the switching circuit means tends to perform a false operation due to extraneous disturbances, such as undesirable light other than that produced by this apparatus. In the case the undesirable extraneous disturbances exist, the optimum total quantity of light on the film of the camera can not be obtained.

On the other hand, there are disclosed apparatus of the types which can prevent the untimely operation of the switching circuit due to the extraneous disturbances in U.S. Pat. No. 3,519,879 and Re. No. 26,999.

In the apparatus disclosed in the U.S. Pat. No. 3,519,879, the light responsive integrating circuit is actuated to receive light reflected from the object to be photographed upon initiating the discharge of the flash tube. In the apparatus disclosed in U.S. Pat. Re. No. 26,999, the light responsive integrating circuit for generating a discharge terminating signal is actuated upon receiving light reflected from the photographed object or direct light from the flash tube.

However, these two types have a disadvantage that, when the camera and flash apparatus are near the object (for example, of the order 10 to 50 cm), an excessive quantity of light tends to fall on the film in the camera. This is due partly to the nonlinearity characteristics of the flash tube light output with time and partly to the delay time of the integrating circuit based on the rise time of semiconductor elements included therein until the integrating circuit is brought into a stable electric condition. That is, when the camera is very near the object to be photographed, although the photoelectric conversion element included in the integrating circuit receives light reflected from the object in a very short time since the flash tube produced light, the integrating circuit cannot respond rapidly to the light due to the delay time. Therefore, this circuit cannot measure the quantity of reflected light with accuracy from the instant of the production of light. Note that the light output from the flash tube reaches the peak intensity in a very short time (30 to 40 microseconds) from the initiation of the discharge and then drops down slowly. Therefore, unless the integrating circuit has been in a completely responsive condition since the initiation of the discharge, there is the tendency of excessive exposure.

SUMMARY OF THE INVENTION

Accordingly, the object of this invention is to provide an electronic flash apparatus capable of preventing not only the false operation of a switching element to terminate the discharge of a flash tube due to extraneous disturbances, but also an excessive quantity of light on the film in a camera even when the camera is near an object to be photographed.

The object of the invention can be attained only by providing in the prior art electronic flash apparatus means for causing the light responsive integrating circuit to be made ready to receive light produced by the discharge of the flash tube and reflected from a photographed object prior to actuation of trigger circuit to generate a trigger signal for initiating the discharge of the flash tube.

BRIEF DESCRIPTION OF THE DRAWING

FIG. 1 is a circuit diagram of an electronic flash apparatus according to the present invention; and FIG. 2 is a circuit diagram of an electronic flash apparatus according to another embodiment of the invention.

DESCRIPTION OF THE PREFERRED EMBODIMENTS

Referring now to FIG. 1 a storage capacitor 1 is connected between conductors 2 and 3. Main electrodes 5 and 6 of a flash tube 4 are connected to the conductors 2 and 3, respectively. The flash tube 4 has a trigger electrode 7 which is connected to a trigger circuit $TR_1$ for delivering a trigger signal to initiate discharge in the flash tube 4. The trigger circuit $TR_1$ is provided with a trigger transformer 8 a secondary winding 9 of which is connected between the trigger electrode 7 and the main electrode 6. One end of a primary winding 10 of the transformer 8 is connected to the conductor 2 through a resistor 11 and the other end to the conductor 3 through a capacitor 12 and a resistor 13. A thyristor 14 is connected across the series connection of the winding 10 and the capacitor 12.

As a switching means for terminating the discharge of the flash tube 4, a quench tube 15 is connected in parallel with the flash tube 4. Main electrodes 16 and 17 of the quench tube 15 are connected to the conductors 2 and 3, respectively. A trigger electrode 18 of the quench tube 15 is coupled to a trigger circuit $TR_2$ to control the quench tube 15. The trigger circuit $TR_2$ includes a trigger transformer 19, a secondary winding 20 of which is connected between the trigger electrode 18 and the main electrode 17. One end of a primary winding 21 is connected to the conductor 2 through a resistor 22 and the other end is connected to the resistor 13 through a capacitor 23. A thyristor 24 is connected across the series connection of the winding 21 and the capacitor 23.

A capacitor 26 and a resistor 27 are connected in series between the conductor 2 and the resistor 13. A junction P of the resistor 27 and the capacitor 26 is used as a voltage supply point to the above-mentioned trigger circuit $TR_1$ and a below mentioned light responsive integrating circuit LI.

The integrating circuit LI includes a photoelectric conversion element such as a phototransistor 28 and an integrating capacitor 29 connected between the emitter of phototransistor 28 and the resistor 13. The phototransistor 28 receives light reflected from an object to be photographed to produce photocurrent when the flash tube 4 is fired. The integrating capacitor 29 is adapted to produce an integration voltage proportional to the total quantity of light received by the phototransistor 28 in response to the photocurrent flowing therethrough. A transistor 30 is provided to amplify the voltage across the capacitor 29, the base of which is connected to the junction of the capacitor 29 and the emitter of phototransistor 28. The collector of transistor 30 is coupled to the collector of phototransistor 28. The emitter of transistor 30 is connected to the resistor 13 through a potentiometer 31 having a slidable arm 32 which is connected to the gate electrode of thyristor 24 of the trigger circuit $TR_2$. The potentiometer 31 serves to adjust gate sensitivity of the thyristor 24 and the gain of the amplifier 30 and to compensate for the irregularity of capacitance value of the integrating capacitor 29.

The aforementioned voltage supply point P is connected to the collector of phototransistor 28 through a resistor 33 and a normally open switch 34. When the switch 34 is closed, this point P supplies a source voltage to the integrating circuit LI and the amplifier 30. A series connection of a resistor 35 and a capacitor 36 may be connected in parallel with the switch 34 for the purpose described below. A zener diode 37 is disposed between the resistor 13 and a junction Q of the switch 34 and the collector of phototransistor 28 to supply a constant voltage to the phototransistor 28 and the amplifier 30.

The junction Q is connected through a delay circuit DL to the gate electrode of the thyristor 14 included in the trigger circuit $TR_1$. The delay circuit DL may be resistor-capacitor network consisting of a resistor 38 and capacitors 39 and 40. Upon the closure of the switch 34 the junction P delivers a control voltage to the gate electrode of the thyristor 14 through the delay circuit DL. By the operation of a shutter button of the associated camera, the switch 34 is closed. The closed condition of the switch 34 is maintained for a longer period of time than the discharge duration (normally 1 millisecond or less) of the flash tube 4.

Reference numeral 41 is a choke coil which is provided to correct nonlinearity of the light output of the flash tube 4 with time, that is, to slow down the rapid rise of the flash tube light output to a peak intensity.

The conductors 2 and 3 are respectively connected to a storage capacitor charging means, or battery (not shown) through terminals 42 and 43. These conductors are normally maintained at a relatively high voltage, for example, 300 volts. The voltage across the capacitor 26 is normally maintained at about 12 volts.

The operation of the embodiment of the invention will be described. It will be apparent that during the time the switch 34 is open, no source voltage is supplied to the integrating circuit LI. Therefore, upon the reception of the extraneous light, the transistor 28 generates no photocurrent. Under this condition, no voltage is produced across the integrating capacitor 29.

Upon the closure of the switch 34, voltage is supplied directly to the light responsive integrating circuit LI and through the delay circuit DL to the trigger circuit $TR_1$. The integrating circuit LI is thus made ready to receive light and produce photocurrent at the instant of the closure of the switch 34. However, the trigger circuit $TR_1$ is actuated with a delay time (about 10 microseconds) set in the delay circuit DL. Namely, the control voltage is applied from the junction P to the gate electrode of the thyristor 14 to turn on the same with a predetermined delay time after the closure of the switch 34. When the thyristor is turned on, the charge voltage stored in the capacitor 12 is rapidly discharged through the thyristor 14 and the primary winding 10, resulting in the induction of a trigger pulse in the secondary winding 9 and initiation of the discharge of the flash tube 4. The light produced by the discharge of the flash tube 4 illuminates an object to be photographed and the light reflected from the object falls on the phototransistor 28 in the integrating circuit LI. Since the integrating circuit LI has already been in a stable electric condition, the phototransistor 28 generates photocurrent corresponding to the intensity of the incident light, which photocurrent flows into the integrating capacitor 29. Thus, on the capacitor 29 there is obtained an integration voltage increasing with time in proportion to the total quantity of light illuminating the object and the light quantity falling on the camera film. The integration voltage on the capacitor 29 is amplified by the amplifier 30 and is applied to the gate electrode of the thyristor 24 in the trigger circuit $TR_2$ through the slidable arm 32 of the potentiometer 31. Therefore, when the integration voltage, i.e., quantity of light falling on the camera film reaches a predetermined value, the thyristor 24 is turned on. As a result, the charge stored in the capacitor 23 is rapidly discharged as in the trigger circuit $TR_1$ described above to generate a trigger pulse in the secondary winding winding 20 of the transformer 19, thus initiating the discharge of the quench tube 15. Since the quench tube 15 has an impedance lower than that of the flash tube 4, the voltage charge in the storage capacitor 1 is discharged through the quench tube 15 resulting in terminating the discharge of the flash tube 4 and thus stopping the production of light.

As described above, the light producing time of the flash tube is controlled by the light responsive integrating circuit for measuring the total quantity of light falling on the film in the associated camera. Moreover, in accordance with this invention, the light responsive integrating circuit LI is caused to be made ready to receive light at the instant of the closure of the switch 34 prior to the actual initiation of producing light by the flash tube 4 due to the provision of the delay circuit DL. As a result, even when the camera is near the object, the total quantity of light reaching the camera film can be controlled with considerable accuracy because the integrating circuit has already been in a stable electric condition when it receives the light reflected from the object to be photographed. Furthermore, the present invention can prevent the false operation of the quench tube due to the extraneous disturbances.

In FIG. 2 there is shown a modification of the embodiment of FIG. 1 in which a thyristor 50 is connected in series with the flash tube 4 as switching means to terminate the discharge of the flash tube in lieu of the quench tube. The gate electrode of thyristor 50 is connected to the conductor 3 by a resistor 51 and also to the junction of the capacitor 12 and the primary winding 10 in the trigger circuit $TR_1$ through the capacitor 52. A series connection of a resistor 53 and a thyristor 54 is coNnected between the conductors 2 and 3 as means for controlling the switching means 50. The junction of the resistor 53 and the thyristor 54 is connected to the junction of the flash tube 4 and the thyristor 50 through a capacitor 55. The junction of the flash tube 4 and the thyristor 50 is connected to the conductor 3 through a resistor 56. The gate electrode of thyristor 54 is coupled to the slidable arm 32 of the potentiometer 31.

In operation, when the switch 34 is closed, the charge on the capacitor 12 of the trigger circuit $TR_1$ is discharged as mentioned above. Due to the resultant variation of voltage across the capacitor 12, the thyristor 50 is turned on and hence the flash tube 4 is fired. When the integration voltage across the integrating capacitor 29 in the integrating circuit LI reaches a predetermined value, the thyristor 54 is turned on. As a result the voltage across the capacitor 55 is applied to the thyristor 50 in the reverse direction so as to turn the thyristor 50 off, thereby interrupting the discharge path for the flash tube 4 to terminate the discharge across the tube 4.

Even when a chattering action in the operation of the normally open switch 34 in FIGS. 1 and 2 occurs, the supply voltage is applied from the voltage supply point P to the integrating circuit LI and the amplifier 30 due to a series connection of the resistor 35 and the capacitor 36 connected in parallel with the switch 34.

What we claim is:

1. An electronic flash apparatus comprising:
   a flash tube for producing light illuminating an object to be photographed;
   trigger circuit means connected to said flash tube for generating a trigger signal to initiate discharge across said flash tube to produce the light;
   light responsive integrating circuit means adapted to receive light reflected from the object to be photographed for generating a signal to terminate the discharge of said flash tube when the quantity of light reflected from the object reaches a predetermined value;
   switching means coupled to said flash tube;
   means coupled to said light responsive integrating circuit means and for controlling said switching means to terminate the discharge of said flash tube in response to said discharge terminating signal generated by said light responsive integrating circuit means; and
   enabling means for causing said light responsive integrating circuit means to be ready to receive the light produced by said flash tube and reflected from the object to be photographed prior to the actuation of said trigger circuit means to generate said trigger signal, said enabling means including:
   voltage supply means for supplying a control voltage to said trigger circuit means and a source voltage to said light responsive integrating circuit means; and
   delay circuit means coupled between said voltage supply means and said trigger circuit means.

2. An electronic flash apparatus according to claim 1 wherein said light responsive integrating circuit means comprises a photoelectric conversion element adapted to receive the light reflected from the object to be photographed for generating photocurrent; and an integrating capacitor connected in series with said photoelectric conversion element for producing an integration voltage proportional to the total quantity of light received by said photoelectric conversion element.

3. An electronic flash apparatus according to claim 1 wherein said voltage supply means is coupled to said delay circuit means through a normally open switch adapted to be closed by the operation of a shutter button of the associated camera.

4. An electronic flash apparatus according to claim 1 wherein said switching means includes a switching device coupled in parallel with said flash time.

5. An electronic flash apparatus according to claim 1 wherein said switching means includes a switching device coupled in series with said flash tube.

6. An electronic flash apparatus according to claim 3 including a series connection of a capacitor and a resistor coupled in parallel with said normally open switch.

7. An electronic flash apparatus according to claim 1 wherein said voltage supply means is coupled to said trigger circuit through said delay circuit means and through a normally open switch adapted to be closed by the operation of a shutter button of the associated camera.

8. An electronic flash apparatus according to claim 7 including a series connection of a capacitor and a resistor coupled in parallel with said normally open switch.

9. An electronic flash apparatus according to claim 4 wherein said switching device comprises a quench tube.

10. An electronic flash apparatus according to claim 5 wherein said switching device comprises a thyristor.

11. An electronic flash apparatus according to claim 5 wherein said switching means further comprises means responsive to said trigger for turning said switching device on so as to enable said flash tube to produce light; a secondary switching means coupled to said light responsive integrating circuit means and to said switching device for turning said switching device off responsive to said discharge terminating signal generated by said light responsive integrating circuit means.

12. An electronic flash apparatus according to claim 11 wherein said switching device comprises a first thyristor.

13. An electronic flash apparatus according to claim 12 wherein said secondary switching means includes a second thyristor coupled in series with a capacitor, the series combination of said second thyristor and said capacitor being coupled in parallel with said first thyristor; means coupling the gate electrode of said second thyristor to said light responsive integrating circuit means; and means for charging said capacitor to a predetermined level, such that when said second thyristor is turned on in response to said discharge terminating signal, he voltage across said capacitor is applied to said first thyristor in the reverse direction so as to turn said first thyristor off, thereby interrupting the discharge path for said flash tube to terminate the generation of light.

14. An electronic flash apparatus according to claim 13 wherein said means for charging said capacitor comprises a first resistance, one terminal of which is connected to the junction between said capacitor and said first thyristor, and another terminal of which is coupled to a terminal of a power source; and a second resistance, one terminal of which is coupled to the junction between said capacitor and said section thyristor, and another terminal of which is coupled to another terminal of a power source.

* * * * *